US008832725B2

United States Patent
Ahrens

(10) Patent No.: US 8,832,725 B2
(45) Date of Patent: Sep. 9, 2014

(54) ON-DEMAND CONTENT CONTROL BASED ON PARENTAL CONTROL SETTING

(75) Inventor: Douglas L. Ahrens, Norcross, GA (US)

(73) Assignee: Cisco Technology, Inc., San Jose, CA (US)

( * ) Notice: Subject to any disclaimer, the term of this patent is extended or adjusted under 35 U.S.C. 154(b) by 954 days.

(21) Appl. No.: 12/194,495

(22) Filed: Aug. 19, 2008

(65) Prior Publication Data

US 2010/0050216 A1 Feb. 25, 2010

(51) Int. Cl.
*H04N 7/16* (2011.01)
*H04N 7/173* (2011.01)
*H04N 21/435* (2011.01)
*H04N 21/2225* (2011.01)
*H04N 21/2343* (2011.01)
*H04N 21/8405* (2011.01)
*H04N 21/258* (2011.01)
*H04N 21/475* (2011.01)
*H04N 21/266* (2011.01)
*H04N 21/8355* (2011.01)
*H04N 21/472* (2011.01)
*H04N 21/235* (2011.01)
*H04N 21/658* (2011.01)

(52) U.S. Cl.
CPC ......... *H04N 7/17318* (2013.01); *H04N 21/435* (2013.01); *H04N 21/2225* (2013.01); *H04N 21/23439* (2013.01); *H04N 21/8405* (2013.01); *H04N 21/25866* (2013.01); *H04N 21/4751* (2013.01); *H04N 21/26603* (2013.01); *H04N 21/8355* (2013.01); *H04N 21/47202* (2013.01); *H04N 21/235* (2013.01); *H04N 21/6582* (2013.01)

USPC .............................................. 725/28; 725/87

(58) Field of Classification Search
CPC ................................................. H04N 21/4542
USPC ................................................... 725/28, 87
See application file for complete search history.

(56) References Cited

U.S. PATENT DOCUMENTS

| 6,226,793 | B1 * | 5/2001 | Kwoh ............................. 725/28 |
| 6,337,947 | B1 * | 1/2002 | Porter et al. .................. 386/281 |
| 8,131,763 | B2 * | 3/2012 | Tuscano et al. ............... 707/783 |
| 2006/0130121 | A1 * | 6/2006 | Candelore et al. ............ 725/145 |
| 2008/0145025 | A1 * | 6/2008 | Wimberly et al. .............. 386/95 |
| 2009/0265731 | A1 * | 10/2009 | Eyer et al. ....................... 725/28 |

OTHER PUBLICATIONS

International Search Report dated Feb. 1, 2010.

* cited by examiner

*Primary Examiner* — Nasser Goodarzi
*Assistant Examiner* — Michael Hong
(74) *Attorney, Agent, or Firm* — Merchant & Gould

(57) ABSTRACT

In one embodiment, an apparatus includes a request receiver, a content selector, and a transmission initiator. The request receiver receives a request from a remote player for a transmission of on-demand content. The request includes a rating control setting. The rating control setting indicates an allowable rating for the on-demand content. The content selector identifies a content file relating to the on-demand content with a rating matching the rating control setting. The content selector also selects, based on the rating control setting, the identified content file for the transmission to the remote player. The transmission initiator initiates the transmission of the selected content file to the remote player.

20 Claims, 5 Drawing Sheets

ON-DEMAND CONTENT CONTROL BASED ON PARENTAL CONTROL SETTING

TECHNICAL FIELD

The present disclosure relates generally to on-demand content distribution.

BACKGROUND

Consumers want a large selection of entertainment content options while still having content control over the accessibility of certain types of entertainment content. This has led to the use of so-called "parental controls," which allow users to block access to specific content. For example, conventional parental controls allow a user to block all content identified by a particular rating.

At the same time, content creators wish to access as broad a market as possible while maintaining creative control over their work. Parental controls that block access to a work due to its rating may limit the breadth of distribution and, thus, the potential income realized by distribution of that work.

OVERVIEW

Embodiments of an apparatus are described. In one embodiment, the apparatus includes a request receiver, a content selector, and a transmission initiator. The request receiver receives a request from a remote player for a transmission of on-demand content. The request includes a rating control setting. The rating control setting indicates an allowable rating for the on-demand content. The content selector identifies a content file relating to the on-demand content with a rating matching the rating control setting. The content selector also selects, based on the rating control setting, the identified content file for the transmission to the remote player. The transmission initiator initiates the transmission of the selected content file to the remote player. Other embodiments of the apparatus are also described.

Other embodiments will become apparent from the following detailed description, taken in conjunction with the accompanying drawings, illustrated by way of example.

BRIEF DESCRIPTION OF THE DRAWINGS

Throughout the description, similar reference numbers may be used to identify similar elements.

DESCRIPTION OF EXAMPLE EMBODIMENTS

In the following description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

While many embodiments are described herein, at least some of the described embodiments facilitate controlling distribution of on-demand content based on a rating control setting. A content control server may receive a request for the on-demand content and the rating control setting. The content control server indentifies a content file having a rating that matches the rating control setting, selects that content file, and initiates transmission of the content file. The content may be any type of content that may be delivered in an on-demand fashion, including, but not limited to, video, audio, static pictures, computer graphics, games, or other content. The on-demand content may be delivered using any type of on-demand technology, including a set top box (STB), a pay-per-view system, a personal video recorder (PVR), a networked PVR, a video on demand system, or another type of on-demand technology.

Figure 1:
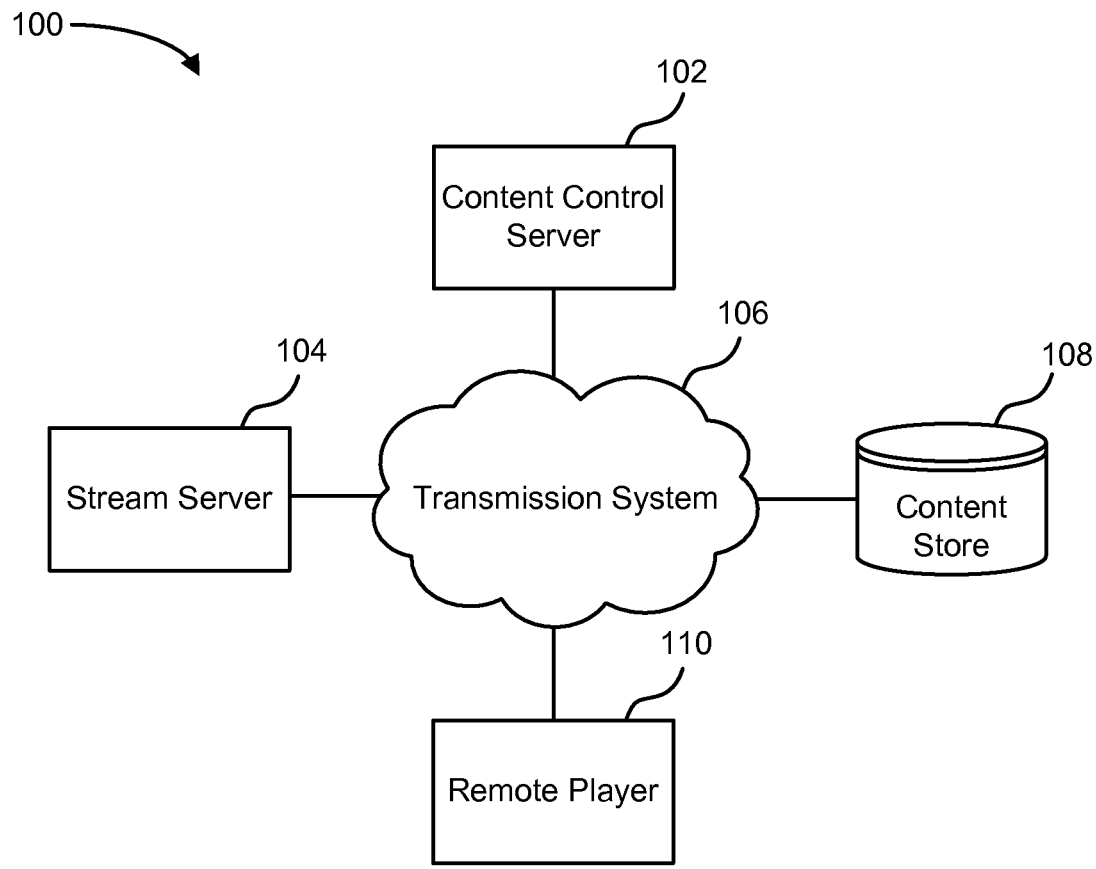
FIG. 1 depicts a schematic diagram of one embodiment of a system for controlling transmission of on-demand content based on a rating control setting.

FIG. 1 depicts a schematic diagram of one embodiment of a system 100 for controlling transmission of on-demand content based on a rating control setting. The system 100, in this embodiment, includes a content control server 102, a stream server 104, a transmission system 106, and a content store 108. The system 100 transmits on-demand content to a remote player 110. Although the depicted system 100 is shown and described herein with certain components and functionality, other embodiments of the system 100 may be implemented with fewer or more components or with more or less functionality. For example, some embodiments of the system 100 include a plurality of stream servers 104, content stores 108, and/or transmission systems 106. Additionally, some embodiments of the system 100 include similar components arranged in another manner to provide similar functionality, in one or more aspects.

The content control server 102, in one embodiment, controls content delivered to the remote player 110 based on a number of parameters, including a rating control setting. In certain embodiments, the content control server 102 receives a request from the remote player 110 to transmit on-demand content. The content control server 102 may evaluate this request against the rating control setting to determine whether to transmit the on-demand content. In another embodiment, the content control server 102 selects from among a plurality of versions of the on-demand content based on the rating control setting.

In certain embodiments, the rating control setting may indicate allowable ratings for on-demand content. Additionally, the rating control settings may reference any combination of known and/or proprietary content rating schemes. For example, the rating control setting may indicate that only content with a rating of between G and PG-13, according to the content rating scheme established by the Motion Picture Association of America (MPAA), should be transmitted. In a further example in which the on-demand content is a movie, the movie may be available in different versions with different ratings. In this example, the content control server 102 evaluates the available versions of the on-demand movie against the rating control setting and only allows the transmission of versions of the movie having a rating between G and PG-13.

In another embodiment, the rating control setting may indicate forbidden ratings for on-demand content. For example, the rating control setting may indicate that content with a rating of R should not be transmitted. In this example, the content control server 102 is configured to evaluate a request for the transmission of on-demand content and to restrict transmission if the content is rated R.

In the above examples, ratings such as those used by the Motion Picture Association of America (MPAA) are used. In other embodiments, any rating system may be used. For example, the on-demand content may be a video game, and the rating system may be that of the Entertainment Software Rating Board (ESRB). In another example, the on-demand content may be music, and the rating system may be the Recording Industry Association of America (RIAA) parental advisory status. In yet another example, a rating system maintained by a governmental or nongovernmental agency in the region where the remote player is located may be used.

In one embodiment, the content control server 102 receives the rating control setting from the remote player 110 over the transmission system 106. In certain embodiments, the rating control setting is received from the remote player 110 as a part of the request for transmission of on-demand content. In an alternative embodiment, the content control server 102 receives the rating control setting separately from the request for transmission of on-demand content. For example, the content control server 102 may receive the rating control setting before the request for on-demand content is received and store the rating control setting for later use.

The stream server 104, in one embodiment, transmits on-demand content to the remote player 110 under direction of the content control server 102. The stream server 104 may use any known technology for transmitting content, such as a radio frequency broadcast, a cable television system broadcast, an Internet protocol (IP) streaming media system, or another transmission technology. In the illustrated embodiment, the stream server 104 is separate from the content control server 102. In an alternative embodiment, the stream server 104 operates on the same computer as the content control server 102 (refer to FIG. 2).

In one embodiment, the content store 108 stores one or more content files relating to the on-demand content. The content files may be accessed by the stream server 104 for transmission to the remote player 110. Content files may be in the form of any known file format for storing media. For example, the content files in the content store 108 may be Moving Picture Experts Group (MPEG)-2 files, MPEG-1 audio layer 3 (MP3) files, executable files, or another known file type for storing content.

In certain embodiments, the content store 108 stores multiple content files relating to on-demand content with one or more of the content files having a different rating. For example, the content store 108 may include content files for two versions of a song—one content file containing an unedited version of the song and the other content file containing a "radio edit" of the song. In this example, the content control server 102 determines which version or versions of the song may be transmitted based on the rating control setting.

The content files may provide any type of content, including audio content, video content, and content that includes audio and video. The content files may provide content such as movies, songs, or other types of content.

In certain embodiments, the content files may include one or more advertisements having a rating. For example, an advertisement may include a rating that indicates that the advertisement should not be transmitted to children under a certain age. The content control server 102 may evaluate the rating control setting against this rating to determine whether the advertisement should be transmitted. In a further embodiment, the content control server 102 may select from among several advertisements, each having an independent rating, to determine which advertisement to transmit.

The content store 108 may use any known method for storing content files. For example, the content store 108 may include a hard drive that stores content files on magnetically encoded spinning platters. In another example, the content store 108 may include flash memory for storage of content files. Other examples of a content store 108 include optical media such as a DVD and magnetic tape media. In the illustrated embodiment, the content store 108 is separate from the content control server 102. In an alternative embodiment, the content store 108 is integrated with the content control server 102 (refer to FIG. 2).

The transmission system 106 transmits the on-demand content, in one embodiment. The transmission system 106 may use any technique for transmitting content. For example, the transmission system 106 may include a cable television network that transmits signals through fixed optical fibers or coaxial cables. The transmission system 106, in another embodiment, includes a satellite transmission system, such as direct broadcast satellite (DBS). In another example, the transmission system 106 may include a digital terrestrial television (DTTV) system such as the Advanced Television Systems Committee (ATSC) standard, the Digital Video Broadcasting-Terrestrial (DVB-T) standard, the Digital Terrestrial Multimedia Broadcast (DTMB) standard, or another transmission standard.

In an alternative embodiment, the transmission system 106 may transmit content over a computer network. For example, the transmission system 106 may include the Internet, and on-demand content may be transmitted using an internet protocol television (IPTV) system. In another example, the transmission system 106 may transmit content relating to a computer game over a computer network (e.g., a LAN or the internet).

In certain embodiments, the transmission system 106 includes a plurality of pathways for transmission. For example, the transmission system 106 may deliver requests for on-demand content from the remote player 110 to the content control server 102 over a telephone line while delivering on-demand content from the content control server 102 to the remote player 110 over a DBS system. Various other types and combinations may be implemented to provide the transmission system 106.

The remote player 110, in certain embodiments, decodes the content transmitted by the content control server 102 for display on a display device (not shown). In one embodiment, the remote player 110 includes a decoder (not shown) that decodes encoded content files, such as a hardware or software MPEG-2 decoder. In certain embodiments, the remote player 110 is separate from the display device. For example, the remote player 110 may be a set-top box (STB). In an alternative embodiment, the remote player 110 is integrated with the display device. For example, the remote player 110 may be a tuner built into a television.

In certain embodiments, the remote player 110 is configured to play video content. In another embodiment, the remote player 110 is configured to play audio content. In some embodiments, the remote player 110 is configured to decode both audio and video.

Figure 2:
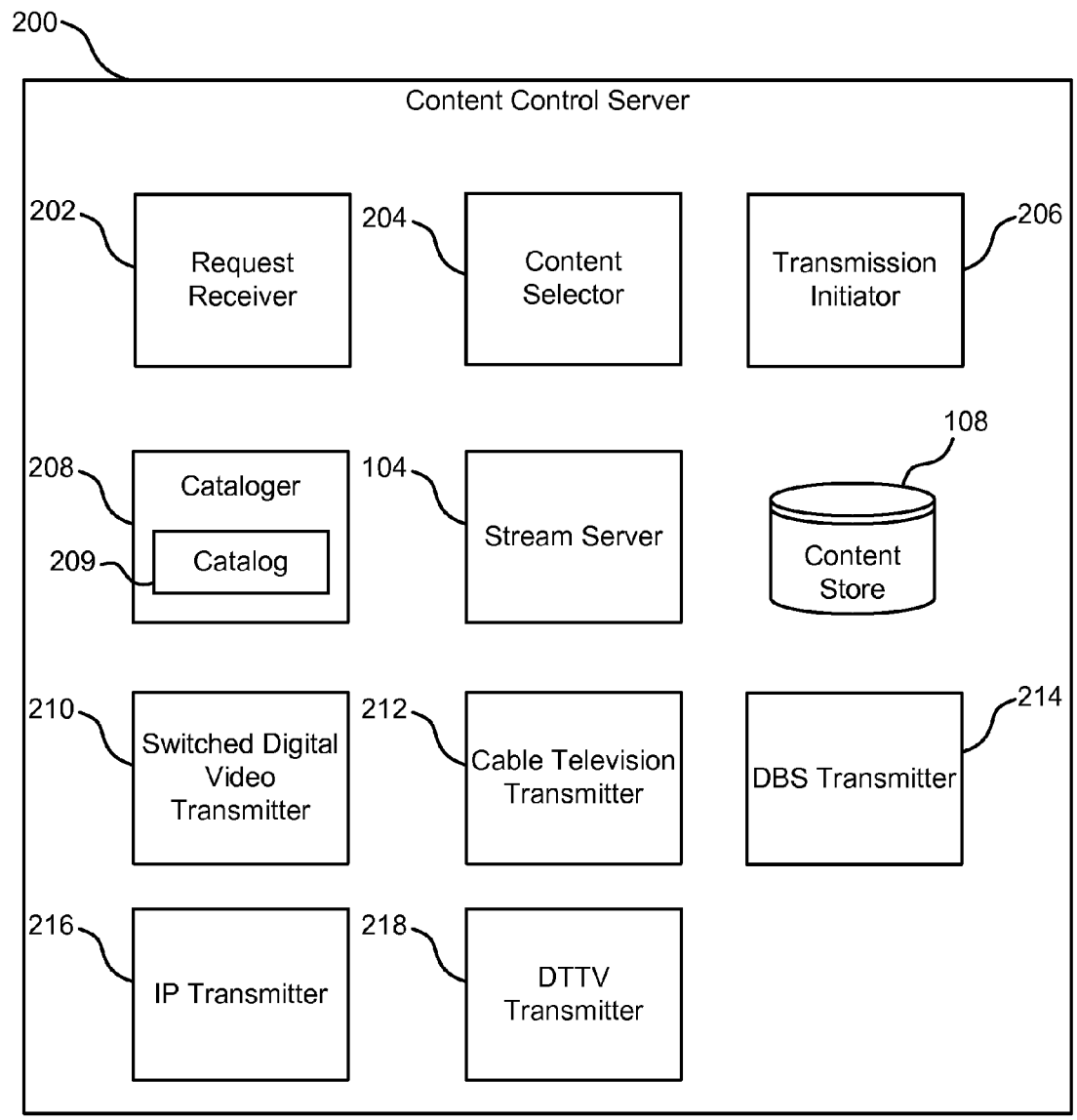
FIG. 2 depicts a schematic diagram of one embodiment of a content control server.

FIG. 2 depicts a schematic diagram of one embodiment of a content control server 200. The content control server 200, in this embodiment, includes a request receiver 202, a content selector 204, a transmission initiator 206, a cataloger 208, the stream server 104, the content store 108, a switched digital video transmitter 210, a cable television transmitter 212, a DBS transmitter 214, an Internet protocol (IP) transmitter 216, and a DTTV transmitter 218. The stream server 104 and the content store 108 are configured to operate as described above. In general, the content control server 200 evaluates requests for transmission of on-demand content relative to a rating control setting.

The request receiver 202, in one embodiment, receives a request for the transmission of on-demand content. In some embodiments, the request receiver 202 also receives a request for a version of the on-demand content having a particular rating. In certain embodiments, the request receiver 202 receives the rating control setting. The request receiver 202 may receive the request over any known system for transmitting requests, including those described in relation to FIG. 1, such as a cable TV system, a computer network, a telephone line, or another transmission system.

The content selector 204 selects the on-demand content for transmission to the remote player 110, in one embodiment. The content selector 204, in some embodiments, evaluates the request using the rating control setting. In one embodiment, the content selector 204 determines the availability of a version of the requested on-demand content matching the rating control setting and selects that version for transmission to the remote player 110.

The content selector 204, in certain embodiments, accesses the content store 108 to determine the availability of a version of the on-demand content that matches the rating control setting. In an alternative embodiment, the content selector 204 accesses the cataloger 208 to determine the availability of a version of the on-demand content that matches the rating control setting.

In one embodiment, the transmission initiator 206 initiates transmission of the selected on-demand content. The transmission initiator 206 may access the stream server 104 and direct the stream server 104 to transmit the selected on-demand content to the remote player 110.

The cataloger 208, in one embodiment, generates a catalog 209 of available versions of on-demand content and the corresponding ratings of those versions of on-demand content. In certain embodiments, the cataloger 208 accesses the content store 108 to determine what versions are available. In some embodiments, the cataloger 208 updates the catalog 209 to reflect changes in the content store 108. The cataloger 208, in certain embodiments, uses a database system to implement the catalog.

In one embodiment, the switched digital video transmitter 210 transmits on-demand content using a switched digital video system (not shown). The switched digital video transmitter 210, in one embodiment, selects an unused channel, physical and/or logical, for transmission of the on-demand content and directs the remote player 110 to access the channel to receive the on-demand content.

The cable television transmitter 212, in one embodiment, transmits the on-demand content over a cable television system (not shown). For example, the cable television transmitter 212 may transmit the on-demand content over a fiber optic system (not shown) to a fiber optic node (not shown) which then distributes the on-demand content to the remote player 110.

The DBS transmitter 214, in certain embodiments, transmits the on-demand content over a DBS system (not shown). For example, the content control server 200 may transmit the on-demand content through the DBS transmitter 214 to a satellite (not shown) which, in turn, transmits the on-demand content to a remote player 110.

In one embodiment, the IP transmitter 216 transmits the on-demand content over an IP system (not shown). For example, the content control server 200 may be connected to the Internet, and the IP transmitter 216 may be an Ethernet connection that breaks content files into packets that are transmitted over the Internet to the remote player 110. Data transport protocols other than IP could also be used.

The DTTV transmitter 218, in one embodiment, transmits on-demand content over the air to the remote player 110 using a DTTV system (not shown). For example, the DTTV transmitter 218 may transmit the on-demand content using the ATSC protocol.

The content control server 200 may include any combination of one or more transmitters. Additionally, some embodiments may include one or more types of transmitters other than the example transmitters described herein.

Figure 3:
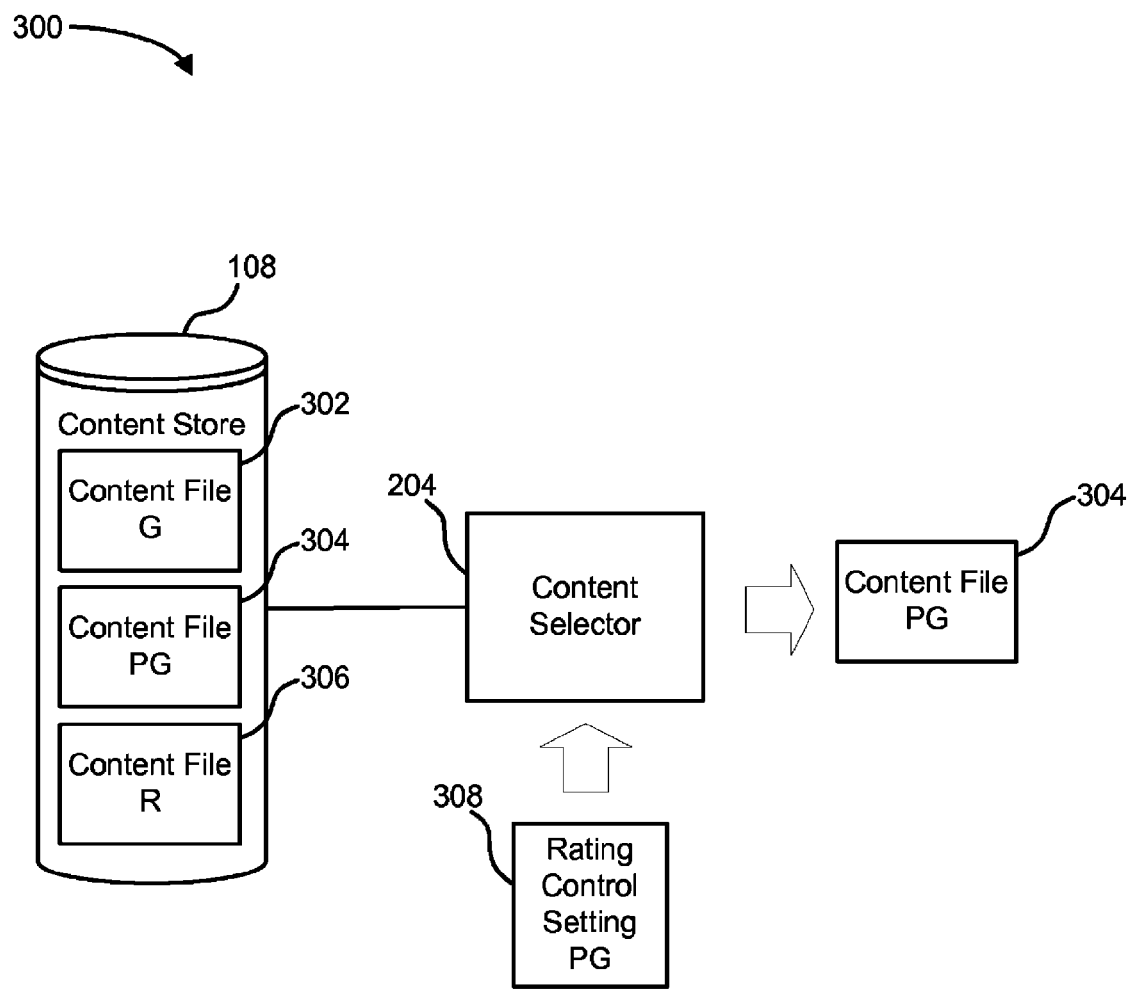
FIG. 3 depicts a schematic flow diagram of one embodiment of a content selection process for implementation on the system of FIG. 1.

FIG. 3 depicts a schematic flow diagram of one embodiment of a content selection process 300 for implementation on the system 100 of FIG. 1. The content store 108, in one embodiment, stores a plurality of content files 302, 304, 306 relating to a particular piece of on-demand content. The content store 108 is accessed, for example, by the content selector 204 to select one or more content files from among the plurality of content files 302, 304, 306.

In one embodiment, the content store 108 includes a plurality of content files 302, 304, 306 relating to a particular piece of on-demand content, and one or more of the content files 302, 304, 306 have different ratings. In the illustrated embodiment, the content store 108 includes a G-rated content file 302, a PG-rated content file 304, and an R-rated content file 306, with all three content files 302, 304, 306 containing a version of substantially the same on-demand content, although one or more of the content files 302, 304, 306 may be edited to match the particular rating.

While the illustrated embodiment shows content files 302, 304, 306 using the rating system of the MPAA for movies, rating systems for other types of media or from other rating organizations may be used. Additionally, in certain embodiments, the content store 108 includes one or more content files using a plurality of types of media and/or rating systems. For example, the content store 108 may include audio files with associated RIAA ratings and video files with associated MPAA ratings.

In certain embodiments, the content selector 204 accesses the content store 108 to determine the availability of a version of the on-demand content that matches a rating control setting 308, for example, within in a content request from a user. The rating control setting 308 may be provided by the remote player 110 or by another mechanism.

For example, in the illustrated embodiment, the rating control setting 308 may indicate that only content files having a rating of PG may be transmitted. The content selector 204, in this example, selects the content file 304 having a rating of PG and initiates transmission of the content file 304. In another embodiment, the rating control setting 308 may indicate that no content filed having an R rating may be transmitted. The content selector 204 then selects one of the matching content files, e.g., either content file 302, rated G, or content file 304, rated PG. In an embodiment, the content selector is configured to select the lowest rated matching content file (e.g., content file 302) and in another embodiment, the content selector is configured to select the highest rated matching content file (e.g., content file 304).

Figure 4:
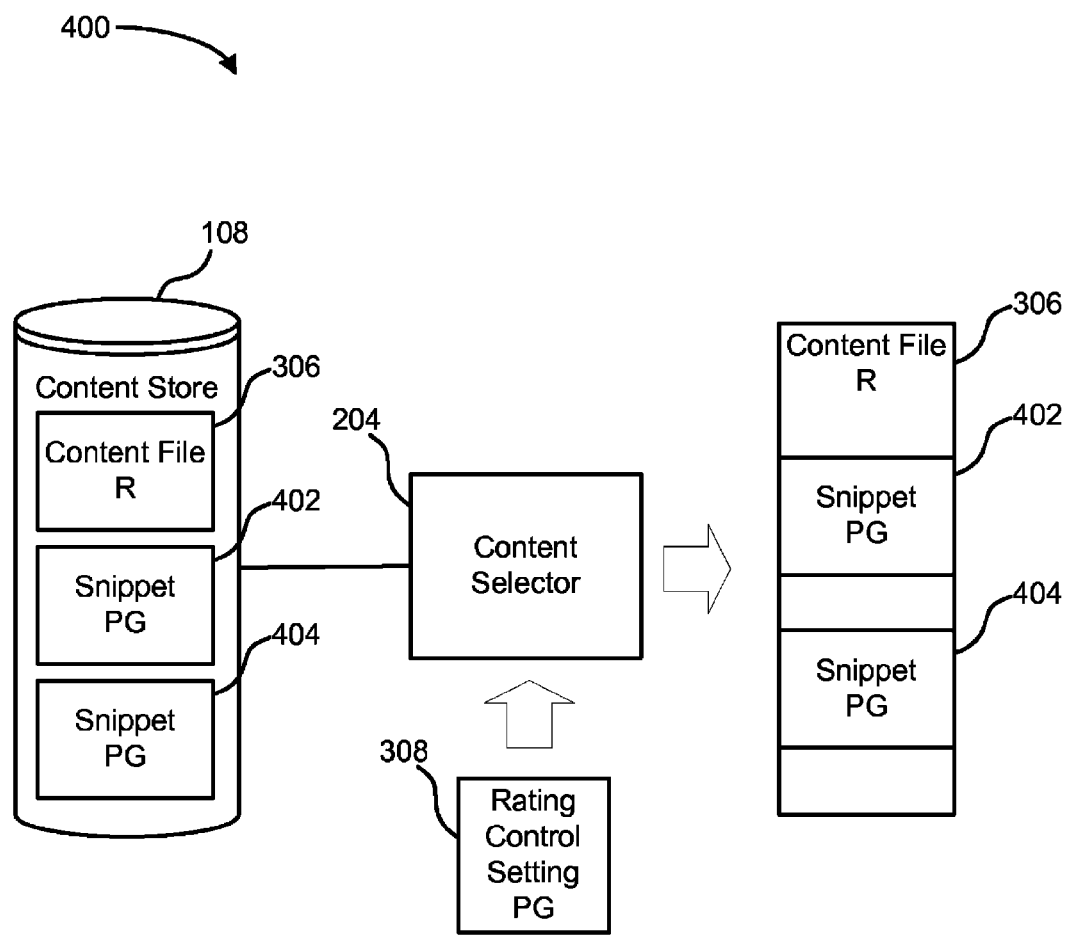
FIG. 4 depicts a schematic flow diagram of another embodiment of a content selection process for implementation on the system of FIG. 1.

FIG. 4 depicts a schematic flow diagram of another embodiment of a content selection process 400 for implementation on the system 100 of FIG. 1. The content store 108, in one embodiment, stores a plurality of content files 306, 402, 404 relating to a particular piece of on-demand content. The content store 108 is accessed by the content selector 204 to select among the plurality of content files 306, 402, 404.

In one embodiment, the plurality of content files 306, 402, 404 relating to a particular piece of on-demand content include an unedited content file 306 along with one or more snippets 402, 404. In one embodiment, each snippet 402, 404 includes an edited portion of the original content of the corresponding unedited content file 306. The snippets 402, 404 are each used to replace a portion of the unedited content file 306 to bring the transmitted on-demand content into compliance with a particular rating.

For example, the unedited content file 306 may be an R-rated movie that includes two segments that include material that prevent the unedited content file 306 from being rated PG. The content store 108, in this example, includes two snippets 402, 404 that include alternative scenes with a PG rating to replace the two segments. The content selector 204 may overlay or otherwise combine the snippets 402, 404 with the corresponding segments of the unedited content file 306 during transmission of the on-demand content to render the transmitted content PG-rated and in compliance with the rating control setting 308. Alternatively, the base content file 306 could be the lowest rated, or edited, version, and the snippets 402, 404 may be higher-rated content for insertion and/or overlay.

In an alternative embodiment, the content store 108 may include information that directs the content selector 204 to remove portions of the unedited content file 306 in order to bring the transmitted on-demand content into compliance with the particular rating control setting 308. In yet another embodiment, the content store 108 may include one or more snippets 402, 404 having various ratings along with information that directs the content selector 204 to remove portions of the unedited content file 306. Other embodiments may implement similar functionality to present the requested content in a form that complies with the rating control setting 308.

Figure 5:
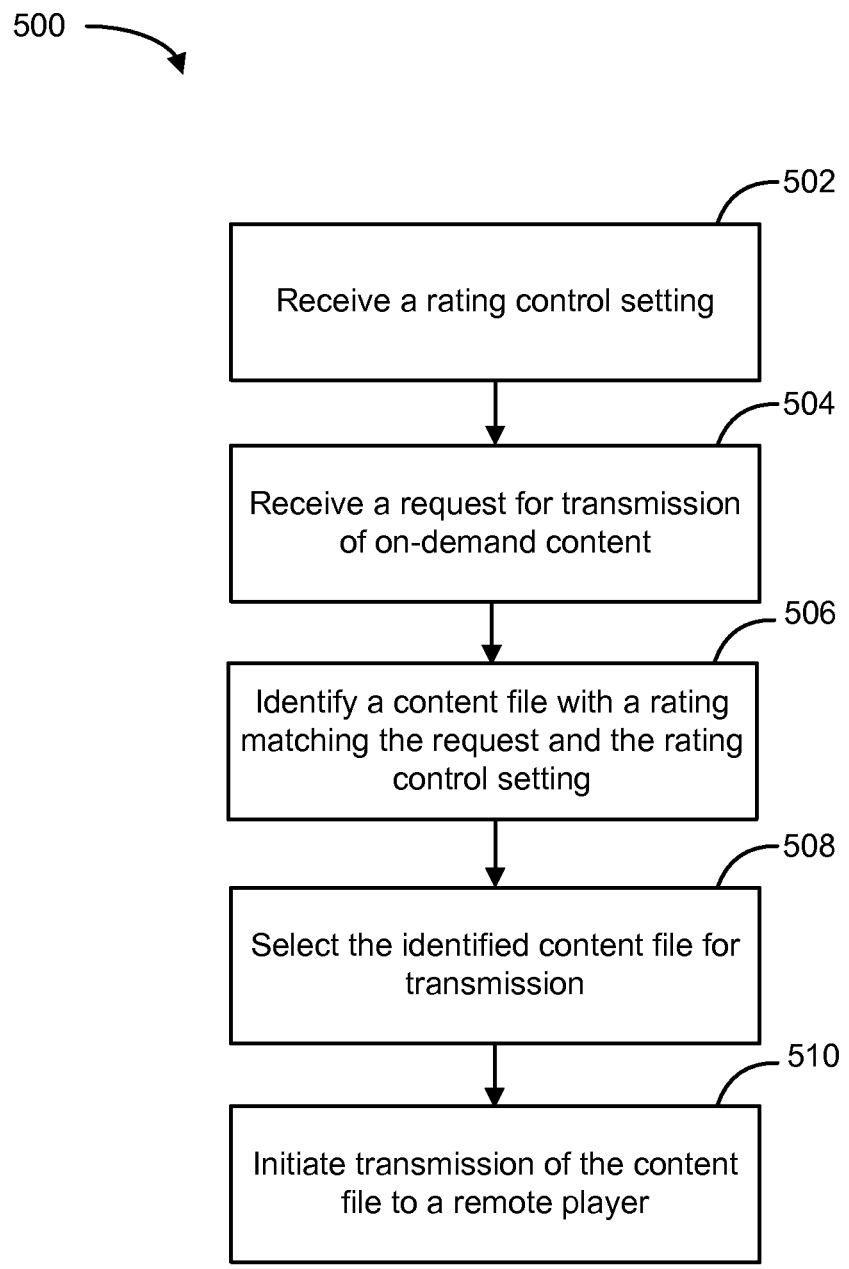
FIG. 5 depicts a flow chart diagram showing one embodiment of a method for controlling transmission of on-demand content based on a rating control setting.

FIG. 5 depicts a flow chart diagram showing one embodiment of a method 500 for controlling transmission of on-demand content based on a rating control setting 308. Although the method 500 is described in conjunction with the system 100 of FIG. 1 and components thereof, other embodiments of the method 500 may be implemented with other content transmission control systems and/or other components thereof.

In one embodiment, the content control server 102 receives 502 a rating control setting 308. In some embodiments, the rating control setting 308 is received 502 from the remote player 110 in connection with a request for transmission of on-demand content. In an alternative embodiment, the rating control setting 308 is received 502 separately from a request for transmission of on-demand content. For example, a persistent rating control setting 308 may be submitted by a user and received 502 at the content control server 102 and stored for future use during subsequent requests for on-demand content.

The content control server 102 receives 504 a request for transmission of on-demand content, in one embodiment. In certain embodiments, the request received 504 by the content control server 102 includes an indicator (e.g., the rating control setting 308) that specifies a version of the on-demand content having a particular rating. In another embodiment, the request may simply indicate the on-demand content requested, and the content control server 102 determines a version of the on-demand content appropriate for delivery.

In one embodiment, the content control server 102 identifies 506 a content file with a rating matching the request and the rating control setting 308. The content control server 102 may access a content store 108 to determine the availability of a content file having a rating that matches the rating control setting 308. In another embodiment, the content control server 102 may include a cataloger 208 that catalogs one or more content files in the content store 108 according to the ratings of the content files. In this embodiment, the content control server 102 identifies 506 a content file with a rating matching the request and the rating control setting 308 by accessing the cataloger 208.

The content control server 102, in one embodiment, selects 508 the identified 506 content file for transmission. In certain embodiments, the selection 508 of the identified 506 content file includes a selection among a plurality of content files that match the rating control setting 308. For example, the rating control setting 308 may indicate a range of appropriate ratings from G to PG-13, and the content store 108 may include versions of the on-demand content including a G rated version and a PG-13 version. In this example, the content control server 102 selects 508 between the appropriately rated versions of the on-demand content, such as sending the lowest rated version available, or sending the highest-rated version that matches the content control setting 308.

In an alternative embodiment, the content control server 102 receives an input indicating which of the appropriate versions of the on-demand content is transmitted. For example, when versions of the on-demand content having multiple ratings which match the rating control setting 308 are available, the content control server 102 may transmit a list of available and allowable versions of the on-demand content. In this example, the content control server 102 may prompt the user for an input indicating which of the listed versions to transmit.

The content control server 102, in one embodiment, initiates 510 the transmission of the content file to the remote player 110. The initiation 510 of transmission of the content file may include a command that directs the stream server 104 to stream the content file. In alternative embodiment, the content control server 102 transmits the content file to the remote player 110.

Other embodiments of the method 200 may implement fewer or more operations. In particular, some embodiments of the method 200 facilitate implementation of any of the functions described above in relation to the system 100 or any of the components thereof. By limiting the transmission of on-demand content to content that matches the rating control setting 308, the system 100 and method 200 may reduce the overall required bandwidth for a content provider. Additionally, by providing control over versions and edits, content producers retain creative control over their work while maintaining access to a relatively broad audience.

At least some of the operations for the method 200 and the system 100 may be implemented using software instructions stored on a computer useable storage medium for execution by a computer. As an example, an embodiment of a computer program product includes logic encoded in one or more tangible media for execution and when executed, causes the computer to perform operations, as described above.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable storage medium providing program code for use by or in connection with a computer or any instruction execution system. For the purposes of this description, a computer-usable or computer readable storage medium can be any apparatus that can store the program for use by or in connection with the instruction execution system, apparatus, or device.

The computer-useable or computer-readable storage medium can be an electronic, magnetic, optical, electromagnetic, infrared, or semiconductor system (or apparatus or device), or a propagation medium. Examples of a computer-readable storage medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), a digital video disk (DVD), and high-definition (HD) disks such as Blu-Ray and HD-DVD.

An embodiment of a data processing system suitable for storing and/or executing program code includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An apparatus comprising:
   a request receiver to receive a request from a remote player for a transmission of on-demand content, the request comprising a rating control setting comprising a video rating from a first rating source and an audio rating from a second rating source, the rating control setting to indicate an allowable rating for the on-demand content;
   a content selector coupled to the request receiver, the content selector to identify a content file relating to the on-demand content with a rating matching the rating control setting, wherein the content file comprises a video component having the video rating and an audio component having the video rating, and to select the identified content file for the transmission to the remote player, the selection based on the request and the rating control setting wherein the content selector being configured to identify the content file comprises the content selector being configured to,
      retrieve an unedited version file relating to the on-demand content,
      retrieve at least one snippet from a plurality of snippets, each of the at least one snippet comprising an edited version of a segment from the unedited version file and having the rating matching the rating control setting,
      prompt a user for an input indicating a snippet from the at least one snippet to transmit, and
      replace the segment with the snippet from the at least one snippet, indicated by the user, to create the identified content file relating to the on-demand content; and
   a transmission initiator coupled to the content selector, the transmission initiator to initiate the transmission of the selected content file to the remote player.

2. The apparatus of claim 1, further comprising a content store coupled to the transmission initiator, the content store to store the content file relating to the on-demand content.

3. The apparatus of claim 1, further comprising a cataloger coupled to the content selector, the cataloger to catalog a plurality of content files according to a corresponding rating associated with at least one of the plurality of content files.

4. The apparatus of claim 1, wherein the rating control setting is configured to indicate a range of allowable ratings for the on-demand content.

5. The apparatus of claim 1, wherein the rating control setting further comprises location information of the remote player and configured to indicate the allowable rating for the on-demand content based on the location information of the remote player the location information of the remote player comprises regional information and the rating control setting comprises a government controlled rating system.

6. The apparatus of claim 1, wherein the first rating source is the MPAA and the second rating source is the RIAA.

7. The apparatus of claim 2, wherein:
   the content store is configured to store a plurality of content files relating to the on-demand content, at least one of the plurality of content files comprising a corresponding rating; and
   the content selector is configured to select among the plurality of content files based on the rating control setting.

8. The apparatus of claim 7, wherein each of the plurality of content files comprises a complete version of the on-demand content.

9. The apparatus of claim 7, wherein at least one content file of the plurality of content files comprises the at least one snippet.

10. A method comprising:
    receiving a rating control setting from a remote player, wherein receiving the rating control setting comprises receiving a video rating from a first rating source and an audio rating from a second rating source, the rating control setting to indicate an allowable rating for on-demand content;
    receiving a request from the remote player for transmission of the on-demand content;
    identifying a content file relating to the on-demand content with a rating matching both the video rating and the audio rating wherein identifying the content file comprises,
       retrieving an unedited version file relating to the on-demand content,
       retrieving at least one snippet from a plurality of snippets, each of the at least one snippet comprising an edited version of a segment from the unedited version file and having the rating matching the rating control setting,
       prompting a user for an input indicating a snippet from the at least one snippet to transmit, and
       replacing the segment with the snippet from the at least one snippet, indicated by the user, to create the identified content file relating to the on-demand content;
    selecting the identified content file for the transmission to the remote player, the selection in response to the request and the rating control setting; and initiating the transmission of the selected content file to the remote player.

11. The method of claim 10, wherein retrieving the unedited version file comprises retrieving the unedited version file having an R-rating and wherein retrieving the at least one snippet comprising the edited version of the segment from the unedited version file, the snippet having the rating matching the rating control setting comprises retrieving the at least one snippet having the rating matching the rating control setting comprising at least one of the following ratings: G, PG, and PG-13.

12. The method of claim 10, wherein retrieving the unedited version file comprises retrieving the unedited version file having a lowest available rating for the on-demand content and wherein retrieving the at least one snippet comprising the edited version of the segment from the unedited version file, the snippet having the rating matching the rating control setting comprises retrieving the at least one snippet having the rating matching the rating control setting comprising a rating higher than the rating of the unedited version file.

13. The method of claim 10, wherein retrieving the unedited version file comprises retrieving the unedited version file having a highest available rating for the on-demand content and wherein retrieving the at least one snippet comprising the edited version of the segment from the unedited version file, the snippet having the rating matching the rating control setting comprises retrieving the at least one snippet having the rating matching the rating control setting comprising a rating lower than the rating of the unedited version file.

14. The method of claim 10, wherein retrieving at least one snippet comprises retrieving at least one snippet wherein each of the at least one snippet comprises information for replacing the segment with the at least one snippet.

15. A system comprising:
  means for receiving a rating control setting comprising a video rating from a first rating source and an audio rating from a second rating source, the rating control setting to indicate an allowable rating for on-demand content;
  means for receiving a request from the remote player for transmission of the on-demand content;
  means for storing a plurality of content files relating to the on-demand content, wherein two or more of the plurality of content files have different ratings;
  means for identifying a content file of the plurality of content files with a rating matching the both the video rating and the audio rating wherein the means for identifying the content file comprises:
    means for retrieving an unedited version file relating to the on-demand content,
    means for retrieving at least one snippet from a plurality of snippets, each of the at least one snippet comprising an edited version of a segment from the unedited version file, and having the rating matching the rating control setting,
    means for prompting a user for an input indicating a snippet from the at least one snippet to transmit, and
    means for replacing the segment with the snippet from the at least one snippet, indicated by the user, to create the identified content file relating to the on-demand content;
  means for selecting the identified content file for the transmission to the remote player, the selection in response to the request and the rating control setting; and
  means for initiating the transmission of the selected content file to the remote player.

16. The system of claim 15, further comprising means for streaming the content file to the remote player.

17. The system of claim 15, further comprising means for transmitting the on-demand content to the remote player over a switched digital video network scheme.

18. The system of claim 15, further comprising means for transmitting the on-demand content to the remote player over a direct broadcast satellite (DBS) system.

19. The system of claim 15, further comprising means for transmitting the on-demand content to the remote player over an internet protocol (IP) network.

20. The system of claim 15, further comprising means for transmitting the on-demand content to the remote player over a digital terrestrial television (DTTV) system.

* * * * *